United States Patent [19]

Wacker et al.

[11] 3,840,260

[45] Oct. 8, 1974

[54] BUMPER ARRANGEMENT OF A VEHICLE, ESPECIALLY AT A MOTOR VEHICLE

[75] Inventors: Siegfried Wacker, Schonaich; Bela Barenyi, Maichingen, both of Germany

[73] Assignee: Daimler-Benz Aktiengesellschaft, Stuttgart, Germany

[22] Filed: May 15, 1972

[21] Appl. No.: 253,424

[30] Foreign Application Priority Data
May 17, 1971 Germany............................ 2124427

[52] U.S. Cl. .................................. 293/86, 293/70
[51] Int. Cl. ............................................ B60r 19/06
[58] Field of Search ............ 293/70, 72, 84, 85, 86, 293/89, 1; 267/139

[56] References Cited
UNITED STATES PATENTS
1,792,157  2/1931  Franke................................. 293/72

| | | | |
|---|---|---|---|
| 1,855,977 | 4/1932 | Llobet.................................. | 293/89 |
| 3,097,725 | 7/1963 | Peterson ............................. | 293/70 |
| 3,459,004 | 8/1969 | Morini................................. | 293/72 |
| 3,610,609 | 10/1971 | Sobel................................... | 293/1 |

FOREIGN PATENTS OR APPLICATIONS
1,231,292  5/1971  Great Britain..................... 267/139

Primary Examiner—M. Henson Wood, Jr.
Assistant Examiner—Robert Saifer
Attorney, Agent, or Firm—Craig & Antonelli

[57] ABSTRACT

An arrangement of a preferably inherent rigid bumper at a vehicle, especially at a motor vehicle, which is yieldingly supported at the support structure of the vehicle such as the vehicle frame or chassis frame, by means of two shock absorbers arranged laterally of the support structure which extend generally in the vehicle longitudinal direction and are secured at the support structure as well as at the bumper by way of joints having vertical axes.

38 Claims, 11 Drawing Figures

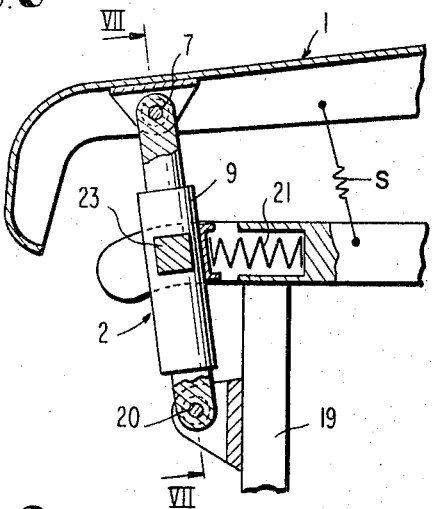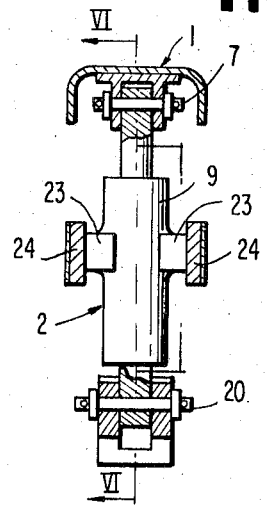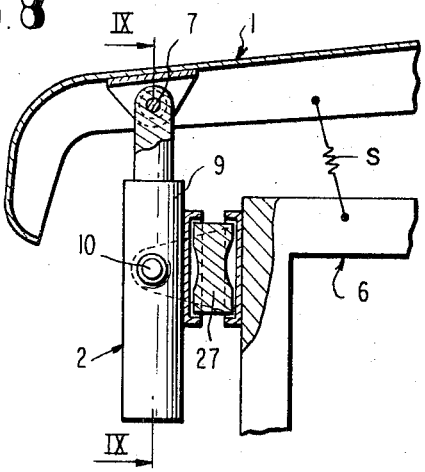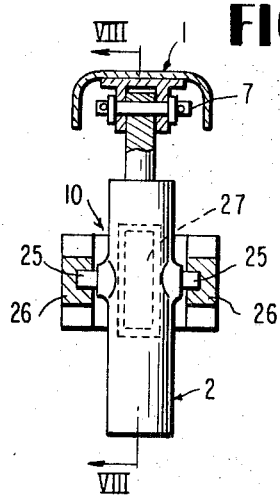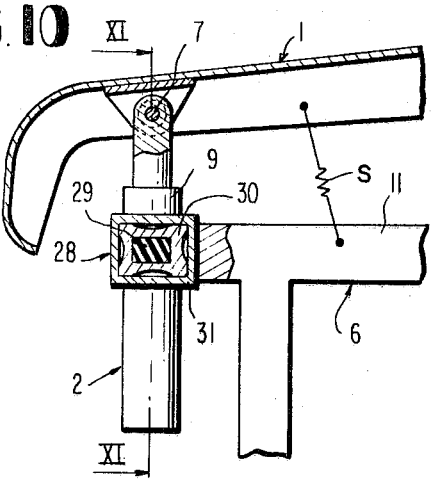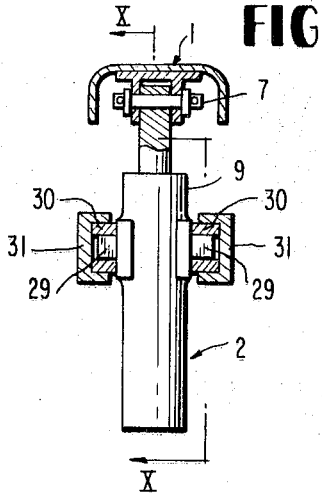

BUMPER ARRANGEMENT OF A VEHICLE, ESPECIALLY AT A MOTOR VEHICLE

The present invention relates to the arrangement of a preferably inherently rigid bumper at a vehicle, especially at a motor vehicle, which is elastically supported at the support structure of the vehicle, such as the frame, chassis frame or the like.

The yielding arrangement of bumpers has the advantage compared to the rigid arrangement nearly exclusively utilized heretofore that in case of smaller collisions neither the bumpers themselves nor the support structure supporting the same are damaged. In known types of construction, the yielding support of the bumpers takes place by way of rubber or metal springs. These supports, however, entail difficulties since the weight of the bumpers stresses the springs also in a vertical direction so that additional guide means have to be provided. Therebeyond, such an arrangement tends to the formation of oscillations which are caused by road unevennesses or engine vibrations or the like.

The present invention is concerned with the task to provide an arrangement of the aforementioned type which enables a yielding support of the bumper without the danger of the formation of oscillations or vibrations. The present invention essentially consists in that two shock absorbers are arranged laterally of the support structure which extend approximately in the vehicle longitudinal direction and are secured both at the support structure as also at the bumper by way of joints with vertical axes. Shock absorbers which are arranged in this manner prevent with certainty the development of oscillations whereas they are at the same time in a position to yield also in case of eccentric and oblique loads of the bumper with simultaneous dissipation of energy.

Provision is made in one advantageous embodiment of the present invention that two double-acting shock absorbers are pivotally connected forwardly in the center of the support structure which extend forwardly obliquely and which together with the shock absorbers extending approximately in the vehicle longitudinal direction are secured in common joints at the bumper. These shock absorbers change their position little in case of empingement of obstacles in the vehicle longitudinal direction so that they possess a lesser effect in this direction whereas they absorb a considerable proportion of the load in case of oblique impacts or the like. It is thereby structurally favorable if the two obliquely disposed shock absorbers subtend in the normal rest position an angle of about 150°. In order to assure a defined normal rest position for the bumper with respect to the support structure, it is appropriate if the shock absorbers include spring elements holding the same in their normal rest position.

In an advantageous embodiment of the present invention, the cylinders of the lateral shock absorbers are pivotally connected at their rear ends to the support structure and are supported within the area of their forward ends in the cross direction at the support structure whereby they extend slightly obliquely forwardly in the rest position. With this type of construction of the present invention, the lateral shock absorbers which extend far-reachingly in the vehicle longitudinal direction suffice for the absorption of all loads so that one can dispense with transversely disposed shock absorbers. The slightly inclined mounting of the shock absorbers assures that they can move about their pivot joint without impairment by the support structure.

In another embodiment of the present invention, the cylinders of the lateral shock absorbers are pivotally connected at the support structure within the area of their forward ends whereby the joint axes are disposed at a distance from the lateral parts of the support structure.

In an advantgeous embodiment of the present invention, provision is made that elastic bearings, especially rubber bearings are provided between the lateral shock absorbers and the support structure. These elastic bearings effect in a simple manner the return forces necessary for assuring the normal rest position. If the transversely disposed shock absorbers are to be dispensed with in that connection, then shock absorbers have to be utilized which can be subjected to bending moments to a sufficient extent.

Provision is made for the aforementioned purpose in another embodiment of the present invention that the joints, esecially the joints connecting the lateral shock absorbers with the support structure include elastic return elements. In a structurally simple type of construction of the present invention, the cylinders of the lateral shock absorbers include at the top and bottom thereof diametrically opposite pins which have a polygonal cross section and engage in rubber-elastic members that are surrounded externally by polygonal mounting supports secured at the support structure.

According to a further feature of the present invention, provision is made in order to assist the effect of the shock absorbers that additionally springs, preferably pre-stressed springs are provided between the bumper and the support structure. These springs may be constructed as leaf springs, spindle springs, cone springs or cylindrical springs or the like.

The present invention excels by a particular neatness and simplicity whereby the completely satisfactory function and the completely satisfactory absorption of the forces from all directions is achieved with a minimum of parts.

Accordingly, it is an object of the present invention to provide a bumper arrangement on a vehicle, especially on a motor vehicle which avoids by simple means the aforementioned shortcomings and drawbacks encountered in the prior art.

Another object of the present invention resides in a bumper arrangement for vehicles, especially motor vehicles which precludes oscillations of the bumper during operation of the vehicle.

A further object of the present invention resides in an arrangement of a bumper at a motor vehicle which is simple in construction, minimizes the number of parts involved, and effectively eliminates the generation of oscillations on the part of the bumper.

Still a further object of the present invention resides in a bumper arrangement of the aforementioned type which is capable to absorb, with dissipation of energy, shocks and impacts directed against the bumper from all directions.

These and other objects, features and advantages of the present invention will become more apparent from the following description when taken in connection with the accompanying drawing which shows, for purposes of illustration only, several embodiments in accordance with the present invention, and wherein:

FIG. 6 is a partial somewhat schematic plan view, partly in cross section, of another embodiment of a bumper arrangement in accordance with the present invention, taken along line VI—VI of FIG. 7;

FIG. 7 is a cross-sectional view taken along line VII—VII of FIG. 6;

FIG. 8 is a partial somewhat schematic plan view, partly in cross section, thrugh a still further modified embodiment of a bumper arrangement in accordance with the present invention, taken along line VIII—VIII of FIG. 9;

FIG. 9 is a cross-sectional view taken along line IX—IX of FIG. 8;

FIG. 10 is a partial somewhat schematic plan view of still another modified embodiment of a bumper arrangement in accordance with the present invention taken along line X—X of FIG. 11; and FIG. 11 is a cross-sectional view taken along line XI—XI of FIG. 10.

Figure 1:
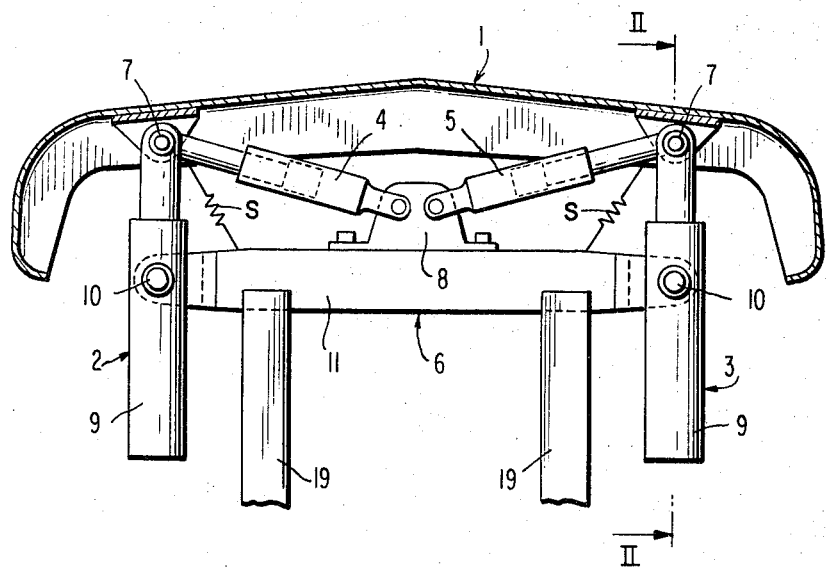
FIG. 1 is a somewhat schematic plan view of a first embodiment of a bumper arrangement in accordance with the present invention.
Figure 2:
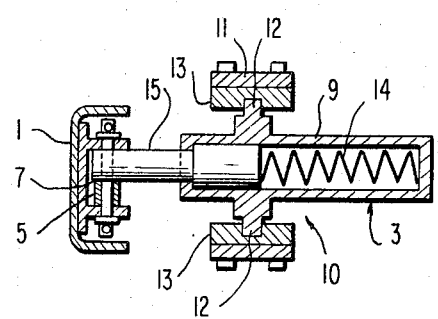
FIG. 2 is a cross-sectional view taken along line II—II of FIG. 1.

Referring now to the drawing, wherein like reference numerals are used throughout the various views, and more particularly to FIGS. 1-5, a bumper generally designated by reference numeral 1 which is as rigid as possible and which consists of a U-shaped profile or sectional member, is supported in this embodiment at a support structure generally designated by reference numeral 6 of a vehicle, for example, of a passenger motor vehicle by way of four shock absorbers 2, 3, 4, and 5. The term "support structure" is used herein to designate any conventional means, such as, a frame, a chassis frame and the like, forming a relatively fixed part of the vehicle on which the bumper is normally mounted. The bumper 1 consisting of the U-shaped profile is bent off in the vehicle center approximately in the shape of an arrow and is bent back at both ends in the direction toward the vehicle. The two outer shock absorbers 2 and 3 extend in the vehicle longitudinal direction in the normal rest position thereof illustrated in FIG. 1. The shock absorbers 2 and 3 are secured directly at the bumper 1 by means of joints 7 which possess vertical joint axes. The two double-acting shock absorbers 4 and 5 of any conventional construction which extend in the transverse direction, are also pivotally secured in the same joints 7. The shock absorbers 4 and 5 enclose in the illustrated normal rest position an angle of 150°. With the other end thereof, they are secured approximately in the vehicle center at a support bracket 8 which is also provided with vertical pivot axes. The cylinders 9 of the shock absorbers 2 and 3 within the area of the forward ends thereof are connected in joints 10 with a cross bearer 11 of the support structure 6. For that purpose, cylindrical pins 12 (FIG. 2) which are diametrically oppositely disposed at the top and bottom are provided at the cylinder 9; the cylindrical pins 12 engage in the bearing plates 13 which are secured at the cross bearer 11. Compression springs 14 are arranged on the inside of the cylinders 9 of the shock absorbers 2 and 3 which force the piston rods 15 of the shock absorbers into the normal rest position illustrated in FIG. 1.

Figure 3:
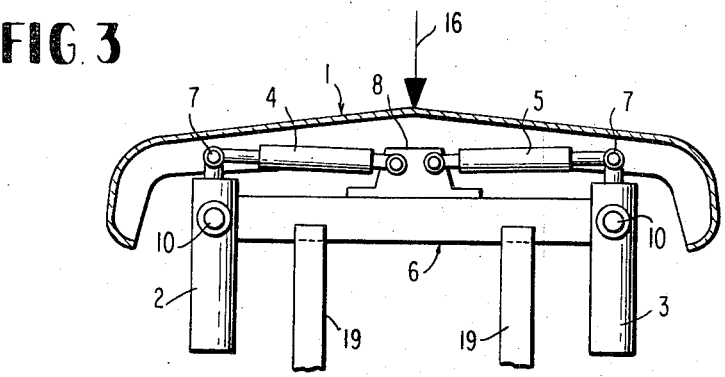
FIGS. 3 to 5 are somewhat schematic plan views of the embodiment of FIGS. 1 and 2 illustrating the same under different load conditions.

If the bumper 1 is subjected in the vehicle center to a load directed in the vehicle longitudinal direction of the vehicle corresponding to the arrow 16, then the bumper 1 assumes with respect to the support structure 6 the position illustrated in FIG. 3, in which the axial direction of the two compressed shock absorbers 2 and 3 extends as before in the vehicle longitudinal direction. The two shock absorbers 4 and 5 are also compressed and are displaced into a position disposed approximately transversely to the vehicle longitudinal direction.

Figure 4:
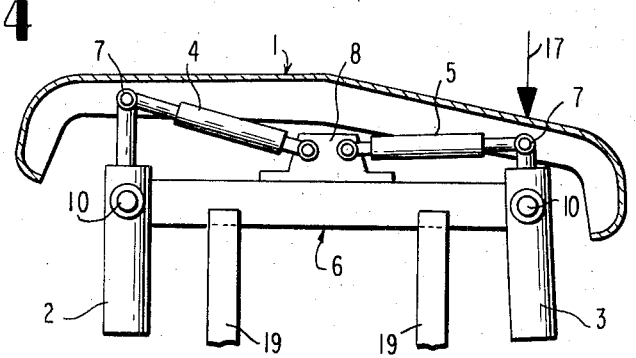

If a force acts on the bumper 1 in the vehicle longitudinal direction eccentrically, i.e., off center, for example, at the height of the shock absorber 3, then the arrangement deforms into the position illustrated in FIG. 4 in which the force acting on the bumper is indicated by the arrow 17. With such a load only the shock absorbers 3 and 5 are compressed whereas the shock absorbers 2 and 4 maintain their normal rest position. The bumper 1 pivots about the common joint 7 of the two shock absorbers 2 and 4 so that the shock absorber 3 is pivoted slightly about its joint 10 during the compression.

Figure 5:
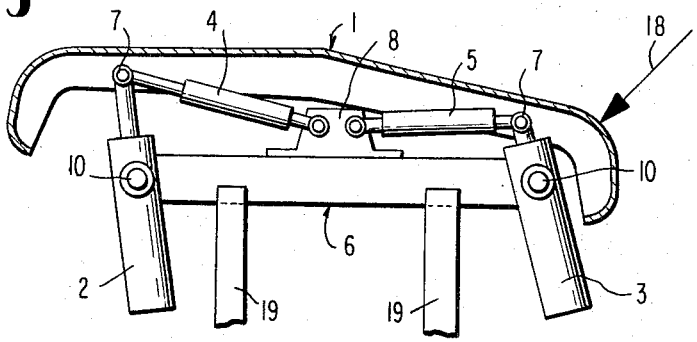

In case of a force impinging on the bumper 1 eccentrically, i.e., off center and obliquely to the vehicle longitudinal direction, the bumper 1 pivots into the position illustrated in FIG. 5 in which the force direction is indicated by arrow 18. The two shock absorbers 3 and 5 are thereby compressed on this vehicle side. Since the bumper 1 has to yield also laterally under such a load, the shock absorbers 2 and 3 are rotated about their joints 10. The joints 10 are disposed at a sufficient distance from the lateral parts of the support structure 6, especially from the longitudinal bearers 19 thereof in order to enable a sufficient pivot path or travel for the shock absorbers 2 and 3. In case of a load of the bumper 1 corresponding to the illustration of FIG. 5, the shock absorber 2 is not compressed. The double-acting shock absorber 4, however, is extended in order to enable a movement of the bumper 1.

In order to enable a return of the bumper 1 into the original position illustrated in FIG. 1, spring elements are provided in a conventional manner, not illustrated in detail, (shown schematically at S in FIGS. 1, 6, 8, and 10) which are arranged either in the joints 7 or 10 or between the bumper 1 and the cross bearer 11 or between the shock absorbers 2 and 3 and the longitudinal bearers 19. The effect of the springs S can then additionally assist the effect of the shock absorbers. Springs S are preferably prestressed so as to function properly in assisting return of the bumper. However, it is also possible to equip only the shock absorbers 2 to 5 with return springs.

The embodiments according to FIGS. 6 to 11 fulfill the same function as the embodiment according to FIG. 1 even though the use of transversely disposed shock absorbers 4 and 5 is dispensed with in connection with the embodiments of FIGS. 6 to 11. In the latter embodiments, the lateral shock absorbers 2 and 3 have to absorb in part considerable bending moments.

In the embodiment according to FIG. 6, the shock absorbers 2 and 3 extend with a slight inclination to the vehicle longitudinal direction. The rear ends of the shock absorbers 2 and 3, which are connected forwardly in a joint 7 with the bumper 1, are secured in this embodiment at the lateral longitudinal bearers 19 of the support structure 6 by means of joints 20 with vertical axes. The cylinder 9 of the shock absorbers 2 and 3 is acted upon within the area of its upper end by means of springs 21 disposed in the transverse direction. Guide pins 23 project from the cylinders 9 of the shock absorbers 2 and 3 in the upward and downward direction which abut at guide surfaces 24 of the cross bearer 11 of the support structure 6. As a result thereof, the joint 20 is far-reachingly relieved from the weight of the shock absorbers 2 and 3 and of the bumper 1.

In the embodiment according to FIGS. 8 and 9, only two shock absorbers 2 and 3 which are disposed in the vehicle longitudinal direction in the normal rest position, are provided between the bumper 1 and the support structure 6. The shock absorbers 2 and 3 pivotally connected at the bumper 1 in a joint 7 having a vertical axis are pivotally connected with the cylinders 9 thereof in a joint 10 on the support structure 6. This joint 10 consists of two cylindrical pins 25 disposed diametrically opposite at the top and bottom and projecting from the cylinder 9 of the shock absorbers 2 and 3, which pins engage in bearings 26. Additionally, a rubber bearing 27 is mounted between the cylinders 9 of the shock absorbers 2 and 3 extending in the longitudinal direction of the vehicle and a part of the support structure extending parallel thereto. The rubber bearing 27 which extends over an area disposed on both sides of the joint 10, produc the return forces which displace the shock absorbers 2 and 3 and therewith the bumper 1 into the illustrated normal rest position thereof. Therebeyond, the rubber bearings 27 assist the effect of the shock absorbers during loads of the bumper 1 which are directed obliquely to the vehicle longitudinal direction. Additionally, it is prevented thereby that an oscillation about the vertical axes of the joints 10 can form.

In the embodiment according to FIGS. 10 and 11, only two lateral shock absorbers 2 and 3 extending in the vehicle longitudinal direction in the normal rest position are provided which connect the support structure 6 with the bumper 1. The cylinders 9 of the shock absorbers 2 and 3 are supported at the cross bearer 11 of the support structure 6 in joints generally designated by reference numeral 28 which possess a vertical axis. The piston rods of the shock absorbers 2 and 3 are pivotally connected at the bumper 1 in joints 7 having vertical axes. In this embodiment, the joints 28 are simultaneously constructed as elastic return elements which produce a return force against a rotation of the shock absorbers 2 and 3. Diametrically opposite pins 29 project upwardly and downwardly from the cylinders 9 which pins have a rectangular cross section. These pins 29 are retained in elastic profiles or sectional members 30, for example, in rubber profiles which are each surrounded externally by a rectangular mounting support 31 that are secured at the longitudinal bearer 11.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An arrangement of a bumper means at a vehicle, which is elastically supported at a support structure of the vehicle, characterized in that two shock absorber means are arranged laterally of the support structure which extend approximately in the vehicle longitudinal direction and are secured at the support structure as well as at the bumper by way of joint means having substantially vertical axes, characterized in that the bumper means is inherently rigid, and characterized in that two double-acting shock absorber means are pivotally secured forwardly substantially in the center of the support structure, said double-acting shock absorber means extending forwardly at an inclination and being secured together with the shock absorber means extending approximately in the vehicle longitudinal direction at the bumper means in common joint means.

2. An arrangement according to claim 1, characterized in that the bumper means has a substantially U-shaped profile.

3. An arrangement according to claim 1, characterized in that the two inclined shock absorber means subtend in the normal rest position thereof an angle of about 150°.

4. An arrangement according to claim 3, characterized in that the shock absorber means include spring means retaining the same in the normal rest position.

5. An arrangement for supporting a bumper means at a relatively fixed support structure of a vehicle; said arrangement comprising:
a shock absorber means extending approximately in the longitudinal direction of said fixed support structure,
first joint means for connecting said shock absorber means to said bumper means such that said shock absorber means is pivotable only about a first joint vertical axis with respect to said bumper means,
second joint means for connecting said shock absorber means to said support structure such that said shock absorber means is pivotable only about a second joint vertical axis with respect to said support structure,
said first and second joint means being spaced from one another in the longitudinal direction,
and transverse support means including resilient means arranged between said shock absorber means and said support structure for resiliently supporting said shock absorber means and bumper means in a predetermined rest position with respect to said support structure, said transverse support means being in direct engagement with one of said shock absorber means, said first joint means and said second joint means.

6. An arrangement according to claim 5, wherein said shock absorber means includes a pair of lateral shock absorber means positioned at respective opposite lateral sides of the vehicle, characterized in that the lateral shock absorber means include cylinder means pivotally secured in the rear area thereof at the support structure and within the area of the forward ends supported at the support structure in a cross direction by spring means, the lateral shock absorber means extending forwardly slightly obliquely in the normal rest position thereof.

7. An arrangement according to claim 6, characterized in that additional spring means are mounted between the bumper means and the support structure.

8. An arrangement according to claim 7, characterized in that said additional spring means are pre-stressed.

9. An arrangement of a bumper means at a vehicle, which is elastically supported at a support structure of the vehicle, characterized in that two shock absorber means are arranged laterally of the support structure which extend approximately in the vehicle longitudinal direction and are secured at the support structure as well as at the bumper by way of joint means having substantially vertical axes, characterized in that the bumper means is inherently rigid, and characterized in that a cylinder means of the lateral shock absorber means are pivotally connected at the support structure within the area of the forward ends thereof.

10. An arrangement according to claim 9, characterized in that the pivot axes are disposed at a distance to lateral parts of the support structure.

11. An arrangement according to claim 5, wherein said shock absorber means includes a pair of lateral shock absorber means positioned at respective opposite lateral sides of the vehicle, characterized in that elastic bearing means are provided between the lateral shock absorber means and the support structure.

12. An arrangement according to claim 11, characterized in that said elastic bearing means are rubber bearing means.

13. An arrangement according to claim 12, characterized in that at least one of the joint means includes elastic return elements.

14. An arrangement according to claim 12, characterized in that the joint means which connect the lateral shock absorber means with the support structure include elastic return elements.

15. An arrangement according to claim 14, characterized in that cylinders of the lateral shock absorber means include at the top and bottom diametrically oppositely disposed pins which have a polygonal cross section and engage in elastic members which are surrounded externally by polygonal mounting means secured at the support structure.

16. An arrangement according to claim 15, characterized in that said elastic members are rubber elastic bodies.

17. An arrangement according to claim 15, characterized in that the polygonal cross section is of rectangular shape.

18. An arrangement according to claim 15, characterized in that additional spring means are mounted between the bumper means and the support structure.

19. An arrangement according to claim 18, characterized in that said additional spring means are pre-stressed.

20. An arrangement according to claim 5, characterized in that rubber bearing means are provided between the shock absorber means and the support structure.

21. An arrangement according to claim 5, wherein said shock absorber means includes a pair of lateral shock absorber means positioned at respective opposite lateral sides of the vehicle, characterized in that the joint means which connect the lateral shock absorber means with the support structure include elastic return elements.

22. An arrangement according to claim 5, wherein said shock absorber means includes a pair of lateral shock absorber means positioned at respective opposite lateral sides of the vehicle, characterized in that the cylinders of the lateral shock absorber means include at the top and bottom diametrically oppositely disposed pins which have a polygonal cross section and engage in elastic members which are surrounded externally by polygonal mounting means secured at the support structure.

23. An arrangement according to claim 5, wherein said shock absorber means includes a pair of lateral shock absorber means positioned at respective opposite lateral sides of the vehicle, characterized in that additional spring means are mounted between the bumper means and the support structure.

24. An arrangement according to claim 23, characterized in that said additional spring means are pre-stressed.

25. An arrangement according to claim 5, wherein said shock absorber means are constructed such that the respective portions thereof between the first and second joint menas are movable with respect to one another only along the line connecting said joint means.

26. An arrangement according to claim 25, further comprising a second shock absorber means spaced laterally from said first mentioned shock absorber means and connected between said bumper means and said support structure in a similar manner as is said first mentioned shock absorber means.

27. An arrangement according to claim 26, wherein said bumper means is inherently substantially rigid along the width thereof between said first and second shock absorber means.

28. An arrangement according to claim 27, wherein said transverse support means include third and fourth shock absorber means pivotally connected for movement only about vertical axes at said support structure and at the respective joint means between said bumper means and said first and second shock absorber means.

29. An arrangement according to claim 28, wherein both said third and fourth shock absorber means are pivotally connected at the center of said support structure and extend laterally outwardly to the pivotal connections thereof at the respective joint means between said bumper means and said first and second shock absorber means, and wherein said third and fourth shock absorber means subtend an angle of approximately 150° when said bumper means is in said predetermined rest position.

30. An arrangement according to claim 27, wherein said second joint means is formed by cylindrical pin portions protruding from a cylinder of said first shock absorber means and vertically aligned and spaced recess means at said support structure for accommodating said pin portions.

31. An arrangement according to claim 27, wherein said bumper means has a substantially U-shaped profile which opens in the direction facing the support structure, and wherein said first joint means includes a vertically extending pivot pin supported inside of said U-shaped profile.

32. An arrangement according to claim 25, wherein said transverse support means includes a further shock absorber means having one end pivotally connected at said first joint means for pivotal movement only about said first joint vertical axis and the other end pivotally connected at a further joint means on said support structure for pivotal movement only about a further vertical axis of said further joint means.

33. An arrangement according to claim 32, wherein said further shock absorber means is a double acting shock absorber means.

34. An arrangement according to claim 25, wherein said transverse support means includes spring means engageable at said support means and at a position on said shock absorber means intermediate said first and second joint means.

35. An arrangement according to claim 34, wherein said shock absorber means includes relatively movable piston and cylinder means, and wherein said cylinder means includes outward protrusions which abuttingly engage said spring means.

36. An arrangement according to claim 25, wherein said transverse support means includes an elastomeric material bearing means interposed between said support structure and a support bracket for said shock absorber for said second joint means.

37. An arrangement according to claim 25, wherein said transverse support means includes elastic return elements forming said second joint means.

38. An arrangement according to claim 37, wherein said elastic return means includes elastomeric material means arranged symmetrically about said second joint vertical axis.

* * * * *